(12) United States Patent
Rosay et al.

(10) Patent No.: US 11,455,433 B2
(45) Date of Patent: Sep. 27, 2022

(54) METHOD OF DVFS-POWER MANAGEMENT AND CORRESPONDING SYSTEM (71) Applicant: STMicroelectronics (Grand Ouest) SAS, Delarue (FR)

(72) Inventors: Arnaud Rosay, Voivres lès le Mans (FR); Gerald Lejeune, Mareil-sur-Loir (FR); Jean Nicolas Graux, Yvre L Eveque (FR); Olivier Claude LeBreton, Saint Mars d'Outillé (FR)

(73) Assignee: STMICROELECTRONICS (GRAND OUEST) SAS, Delarue (FR)

( * ) Notice: Subject to any disclaimer, the term of this patent is extended or adjusted under 35 U.S.C. 154(b) by 460 days.

(21) Appl. No.: 16/579,442

(22) Filed: Sep. 23, 2019

(65) Prior Publication Data

US 2020/0104537 A1 Apr. 2, 2020

(30) Foreign Application Priority Data

Oct. 1, 2018 (FR) ...................... 1859052

(51) Int. Cl.
*G06F 21/81* (2013.01)
*G06F 1/28* (2006.01)
*G06F 21/75* (2013.01)
*G06F 21/60* (2013.01)

(52) U.S. Cl.
CPC .............. *G06F 21/81* (2013.01); *G06F 1/28* (2013.01); *G06F 21/604* (2013.01); *G06F 21/755* (2017.08)

(58) Field of Classification Search
CPC .......... G06F 21/81; G06F 21/755; G06F 1/28; G06F 21/604

USPC .......................................................... 726/27
See application file for complete search history.

(56) References Cited

U.S. PATENT DOCUMENTS

| 6,178,550 B1* | 1/2001 | Pearce ................. G06F 9/4843 711/163 |
| 11,080,675 B1* | 8/2021 | Guise ................. G06Q 20/3278 |
| 2005/0055588 A1* | 3/2005 | Nalawadi ............ G06F 9/45558 713/300 |

(Continued)

OTHER PUBLICATIONS

Zhang et al., Blacklist Core: Machine-Learning Based Dynamic Operating-Performance-Point Blacklisting for Mitigating Poer-Management Security Attacks, Jul. 2018 (Year: 2018).*

(Continued)

*Primary Examiner* — Farid Homayounmehr
*Assistant Examiner* — Thanh T Le
(74) *Attorney, Agent, or Firm* — Slater Matsil, LLP (57) ABSTRACT

In one embodiment, a system on chip includes a dynamic voltage and frequency scaling (DVFS) power supply, a secure environment, a non-secure environment, and a power supply management control module. The secure environment is configured to generate a secure instruction defining a permitted operating point of voltage and frequency for the DVFS power supply. The non-secure environment is configured to generate a request to modify the DVFS power supply, where the request to modify includes a voltage-frequency operating point. The power supply management control module is configured to scale the DVFS power supply to the permitted operating point, in response to the request to modify the DVFS power supply.

21 Claims, 4 Drawing Sheets

(56) References Cited

U.S. PATENT DOCUMENTS

| | | | |
|---|---|---|---|
| 2009/0157936 A1* | 6/2009 | Goss | G06F 21/74 |
| | | | 713/300 |
| 2015/0268706 A1* | 9/2015 | Kukola | G06F 21/81 |
| | | | 713/300 |
| 2015/0270701 A1* | 9/2015 | Cambefort | H02M 3/33546 |
| | | | 363/50 |
| 2019/0050570 A1* | 2/2019 | Kannan | G06F 21/85 |
| 2019/0086994 A1* | 3/2019 | Regupathy | G06F 1/3215 |

OTHER PUBLICATIONS

Sheng Zhang, et al., "Blacklist Core: Machine Learning Based Dynamic Operating Performance Point Blacklisting For Mitigating Power Management Security Attacks," Proceedings of the International Symposium On Low Power Electronics And Design, Jul. 25, 2018, 6 pages.

Tang, Adrian et al., "CLKSCREW: Exposing the Perils of Security-Oblivious Energy Management," USENIX, Aug. 16-18, 2017, Vancouver, BC, Canada, 19 pages.

* cited by examiner

METHOD OF DVFS-POWER MANAGEMENT AND CORRESPONDING SYSTEM

CROSS-REFERENCE TO RELATED APPLICATIONS

This application claims priority to French Patent Application No. 1859052, filed on Oct. 1, 2018, which application is hereby incorporated herein by reference.

TECHNICAL FIELD

Implementations and embodiments relate to managing a power supply of the "DVFS" (Dynamic Voltage and Frequency Scaling) type, for systems on chip.

BACKGROUND

Systems on chip (SOC) require security devices for protecting confidential data and sensitive information against copying proprietary content. The connected objects and automotive fields in particular, are particularly sensitive.

The publication by Tang et al. "CLKscrew: Exposing the perils of security-oblivious energy management" ISBN: 978-1-931971-40-9, presented at the 26th USENIX Symposium on Security (August 2017), describes a security vulnerability of current systems on chip.

The security vulnerability mentioned above relates to systems powered by a technique of dynamic voltage and frequency scaling (DVFS).

Systems on chip may comprise computing units in which a secure environment is designed to be inaccessible without certification, and a non-secure environment is accessible from outside, e.g. for running software applications, or establishing a communication with third party apparatus. For example, the secure environment comprises hardware protection mechanisms at the input-output interfaces, such as registers for filtering certified or uncertified data. In addition, the security of communications with the secure environment is essentially based on encryption algorithms such as the Advanced Encryption Standard AES or the encryption standard RSA.

The secure environment is usually referred to by the term "Trusted Execution Environment" and the non-secure environment is usually designated by the term "Rich Execution Environment." The two environments may belong to the same computing unit such as a microprocessor.

Figure 1:
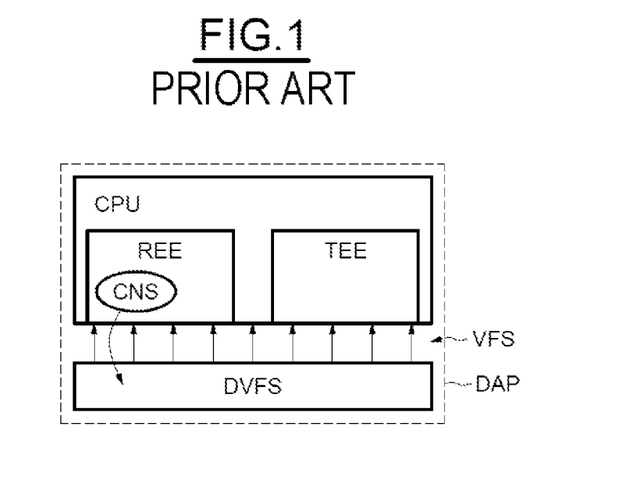
FIG. 1, previously described, illustrates a security vulnerability on conventional systems on chip.

FIG. 1 illustrates an example of a system comprising a secure environment TEE and a non-secure environment REE belonging to the same computing unit CPU and sharing a power supply domain DAP, of the DVFS dynamic voltage and frequency scaling type.

In the shared power domain DAP, voltage and frequency variations VFS may be controlled by the non-secure environment REE. For example, the non-secure environment is governed by an operating system such as Linux, which provides this type of DVFS power supply control.

DVFS power supply control by the non-secure environment REE is useful for optimizing energy consumption, since dynamically adapted to the performance of each use of the system.

However, the publication by Tang et al. mentioned above reveals that there is an attack consisting in modifying the voltages and frequencies VFS of the DVFS power supply by a non-secure code instruction CNS, from the non-secure environment REE. The variation VFS thus ordered makes it possible to introduce a targeted error during processing in the secure environment TEE, which, by being precisely synchronized on a given operation, makes it possible to break the encryption on which the security of the secure environment TEE is based.

In other words, the DVFS power supply is used by the non-secure environment REE to push the secure environment TEE to the limit of its functional power supply to create a temporal coordination error in the logic of the secure environment.

"To break the encryption" is understood to mean, for example, a reconstruction of a secret encryption key. Then, with the encryption key, "non-secure" third-party software can access the secure environment TEE and enjoy its privileges.

It will be noted that this attack is implemented exclusively by software, and could be performed remotely via a network access, which makes it all the more dangerous.

Moreover, it will be noted that the key parameters of the attack are firstly the DVFS power supply control by the non-secure environment REE, and secondly accurate timing for synchronizing the introduction of an error with a given operation of the secure environment TEE.

In the publication mentioned above, Tang et al. propose solutions for preventing such an attack.

It was proposed to introduce at the hardware level operational limits to the possible variations of the DVFS power supply, in order to make it impossible to generate any voltage-frequency pair introducing a malfunction.

However, on the one hand, the operational limits may vary within the same production, notably because of vagaries of manufacturing, and are therefore difficult to determine a priori.

On the other hand, DVFS power supplies are generally used by multiple systems having different constraints and needs, and this is not compatible with physically fixed values.

It was also proposed to use different power supply domains for the secure environment TEE and for the non-secure environment REE. A physically separate power supply is used when the secure environment TEE is active.

Since the secure environment TEE and the non-secure environment REE often run on the same processor CPU, such a solution proves complex to operate. In addition, the surface area used for producing the power supply dedicated to the secure environment TEE is significant, which is problematic.

It was also proposed to introduce randomization programs into the secure environment TEE, which add a random number of non-operation instructions into the algorithms. The execution times vary and complicate the synchronization of the attack.

This solution does not protect the secure environment TEE from an attack that uses a form of execution profiling. In addition, this solution introduces latencies and performance penalties in the secure environment TEE.

Finally, it was proposed to introduce redundancies of some executions and to monitor these redundancies. If one of the results is different, due to an error introduced via the DVFS power supply, the error can be detected.

This solution introduces latencies and performance penalties. Executing an algorithm multiple times necessarily increases the execution time and, in addition to this delay, the energy consumption allocated thereto.

SUMMARY

Implementations and embodiments provide for solving the security problem of systems on chip described in the publication by Tang et al. mentioned above, without suffering the drawbacks of the solutions proposed therein.

According to one aspect, a method is provided in this regard for managing a power supply of the "DVFS" dynamic voltage and frequency scaling type, comprising generation, by a non-secure environment, of a request to modify the DVFS power supply and a DVFS power supply management control comprising generation, by a secure environment, of a secure instruction defining at least one permitted voltage-frequency operating point for the DVFS power supply; and a scaling of the DVFS power supply to a permitted operating point, in response to the request to modify the DVFS power supply.

In other words, whatever the request to modify the DVFS power supply generated by the non-secure environment, the DVFS power supply is always scaled to a "permitted" operating point defined by the secure environment. Thus secure environments are able to define permitted operating points in accordance with each hardware implementation, in order to make it impossible to configure the DVFS power supply under conditions introducing a system malfunction.

Thus the solution provided according to this aspect makes it possible to optimize the DVFS power supply for each system on chip, according to its hardware constraints, without modifying the DVFS power supply stage. A DVFS power supply stage technology may thus be used with different systems on chips implementing power supply management according to this aspect and still benefit from its versatility of power supply for different systems.

In addition, the solution provided according to this aspect has no impact on system performance, since the other algorithms of the secure environment are not modified.

According to one implementation, the permitted operating points for the DVFS power supply are assigned a respective label by the secure environment, and the DVFS power supply is scaled to a permitted operating point if the request to modify the DVFS power supply includes the label of this permitted operating point.

The DVFS power supply may not be scaled if the request to modify the DVFS power supply does not include the label of a permitted operating point.

This implementation is advantageous in terms of compatibility with existing systems, since the request to modify the DVFS power supply from the non-secure environment has only been adapted by the use of labels.

According to one implementation, if the request to modify the DVFS power supply is different from a permitted operating point, then the DVFS power supply is scaled to the nearest permitted operating point. For example, the secure environment receives the request, defines the nearest permitted operating point and controls the DVFS power supply to this nearest operating point.

This implementation is advantageous in the choice of operating points.

According to one implementation, said secure instruction is generated by the secure environment before a start-up of the non-secure environment.

Indeed, the secure environment typically starts up before the non-secure environment and this implementation ensures the integrity of said secure instruction defining the permitted operating points.

According to one implementation, the secure instruction defines a permitted voltage-frequency operating point dedicated to the secure environment, and, if secure processing is executed by the secure environment, said scaling of the DVFS power supply comprises: a scaling of the DVFS power supply to this permitted operating point dedicated to the secure environment; and a non-modification of the DVFS power supply from this permitted operating point, dedicated to the secure environment, in response to the request to modify the DVFS power supply.

In other words, this implementation allows complete freedom in the request to modify the DVFS power supply, but does not take it into account if secure processing is executed by the secure environment.

Advantageously, when the DVFS power supply is scaled to the permitted operating point dedicated to the secure environment, the previous configuration of the DVFS power supply is recorded, and when the secure processing ends, the last recorded configuration is restored.

Advantageously, the recording of the previous configuration and the restoration of the last recorded configuration are carried out by the secure environment.

According to another aspect, a system on chip is provided comprising a power supply of the "DVFS" dynamic voltage and frequency scaling type, a secure environment, a non-secure environment capable of generating a request to modify the DVFS power supply, and a DVFS power supply management control module, wherein: the secure environment is configured for generating a secure instruction defining at least one permitted voltage-frequency operating point for the DVFS power supply; and the power supply management control module is configured for scaling the DVFS power supply to a permitted operating point, in response to a request to modify the DVFS power supply by the non-secure environment.

According to one embodiment, the secure environment is configured for generating said secure instruction assigning a respective label to the permitted operating points for the DVFS power supply, and wherein the power supply management control module is configured for scaling the DVFS power supply to a permitted operating point if the request to modify the DVFS power supply includes the label of this permitted operating point.

Advantageously the power supply management control module is configured for not scaling the DVFS power supply if the request to modify the DVFS power supply does not include the label of a permitted operating point.

According to one embodiment, the power supply management control module is configured for scaling the DVFS power supply to the permitted operating point nearest to an operating point of a request to modify the DVFS power supply, in response to this request to modify the DVFS power supply.

According to one embodiment, the secure environment is configured for generating said secure instruction before a start-up of the non-secure environment.

According to one embodiment, the non-secure environment is configured for sending the request to modify the DVFS power supply to the power supply management control module, the power supply management control module only being configurable by said secure instruction from the secure environment.

According to one embodiment, the power supply management control module is incorporated in the secure environment and the non-secure environment is configured for sending the request to modify the DVFS power supply to the secure environment.

According to one embodiment, the secure environment is configured for generating the secure instruction defining a permitted voltage-frequency operating point dedicated to the secure environment for the DVFS power supply, and, if secure processing is executed by the secure environment, the power supply management control module is configured for:

scaling the DVFS power supply to this permitted operating point dedicated to the secure environment; and not modifying the DVFS power supply of this permitted operating point, dedicated to the secure environment, in response to a request to modify the DVFS power supply.

Advantageously, the secure environment is configured for recording the previous configuration of the DVFS power supply, when the DVFS power supply is scaled to this dedicated permitted operating point, and for restoring the last recorded configuration when the secure processing ends.

An electronic apparatus is also provided, such as a mobile phone or a vehicle on-board computer, comprising a system on chip as defined above, and a voltage supply device configured for supplying a power supply voltage controlled by the power supply management control module.

Advantageously, the electronic apparatus further comprises a wireless communication module capable of giving a third-party device access to the non-secure environment of the system on chip.

BRIEF DESCRIPTION OF THE DRAWINGS

Other advantages and features of the invention will appear on examining the detailed description of embodiments and implementations, in no way restrictive, and the appended drawings in which.

DETAILED DESCRIPTION OF ILLUSTRATIVE EMBODIMENTS

Figure 2:
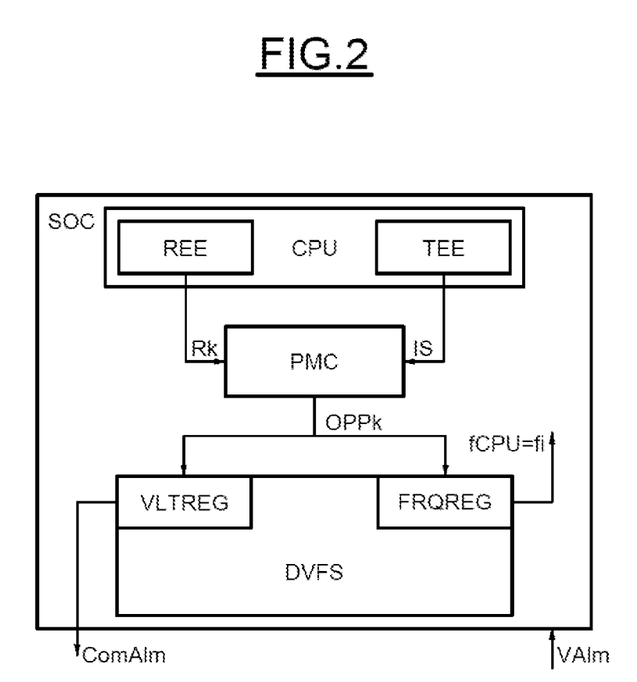
FIGS. 2 to 6 illustrate various implementations and embodiments of the invention.

FIG. 2 represents an embodiment of a system on chip SOC.

The system on chip SOC comprises a power supply of the Dynamic Voltage and Frequency Scaling type, referenced "DVFS." The system on chip comprises a secure environment TEE and a non-secure environment REE, which are software code execution environments, of the microprocessor type.

In this example, the secure environment TEE and the non-secure environment REE belong to the same computing unit CPU, of the microprocessor type. Communications between the secure environment TEE and the outside world, notably the non-secure environment REE, are performed via a hardware interface configured for preventing unauthorized access. It may also be envisaged that the secure environment TEE and non-secure environment REE are implemented on two physically separate computing units sharing the same power supply.

In this example, the DVFS power supply comprises a frequency regulator FRQREG and a voltage regulator VLTREG.

The frequency regulator FRQREG is configured for generating a clock signal fCPU having a clock frequency, used for timing the operations of the computing unit CPU. For example, the frequency regulator comprises a phase locked loop device for generating a periodic clock signal at a frequency that is modifiable on command.

In this example, the voltage regulator VLTREG is configured for generating a control signal ComAlm for setting a power supply voltage, intended to be controlled by an external circuit for generating power supply voltages "PMIC", or Power Management Integrated Circuit. Indeed, the power supply voltage generating circuit is often implemented by an integrated circuit separate from the systems on chip SOC, and may be used for generating and supplying different power supply voltages to different elements of an apparatus comprising the system on chip SOC. A power supply voltage VAlm supplied to the system on chip originates, in this example, from such a generator "PMIC." Reference may be made to the following description in relation to FIG. 6. It is also conceivable for the generation of the power supply voltage VAlm to be carried out by the DVFS power supply incorporated in the system on chip SOC, e.g. in the case of a system on chip SOC intended for an autonomous and independent use.

Thus, the DVFS power supply is configured for supplying a power supply voltage VAlm (where applicable, via the power supply voltage generating circuit "PMIC") and a clock signal fCPU. The expression "power supply voltage and clock signal pair" will be abbreviated to "voltage-frequency pair" and otherwise referred to by the term "operating point" referenced "OPP" for "Operating Performance Point."

The system on chip SOC comprises a power supply management control module PMC, configured for scaling the DVFS power supply, i.e. controlling given values for the voltage-frequency pair VAlm-fCPU supplied to the secure TEE and non-secure REE environments.

Physically, the system on chip SOC is configured so that the DVFS power supply may only be controlled by the power supply management control module PMC, at least as regards the generation of the operating point supplying the computing unit CPU.

The power supply management control module PMC generates a command for the DVFS power supply to set a given permitted operating point OPPk. The given permitted operating point OPPk is established according to a request Rk to modify the DVFS power supply generated by the non-secure environment REE, and a secure instruction IS generated by the secure environment TEE.

Indeed, the secure environment TEE is configured for generating the secure instruction IS defining at least one permitted voltage-frequency operating point OPPi for the DVFS power supply.

The power supply management control module PMC is thus configured in situ by the secure environment TEE, for only generating commands for the DVFS power supply to set a permitted operating point OPPk, from among these permitted operating points OPPi.

Thus, in response to the request Rk (from the non-secure environment REE) the power supply management control module PCM scales the DVFS power supply to a permitted operating point OPPk.

In other words, the power supply management control module PCM manages DVFS power supply command attempts so that the DVFS power supply only provides permitted operating points OPPi defined by the secure environment TEE.

Thus the methods of hacking the secure environment TEE which notably comprise generating an error caused by a power supply with a dysfunctional voltage-frequency pair for the system on chip, are impossible in this system on chip SOC.

If a request to modify the DVFS power supply originates from the secure environment TEE, the request may be processed in the same way by the power supply management control module PMC.

Figure 3:
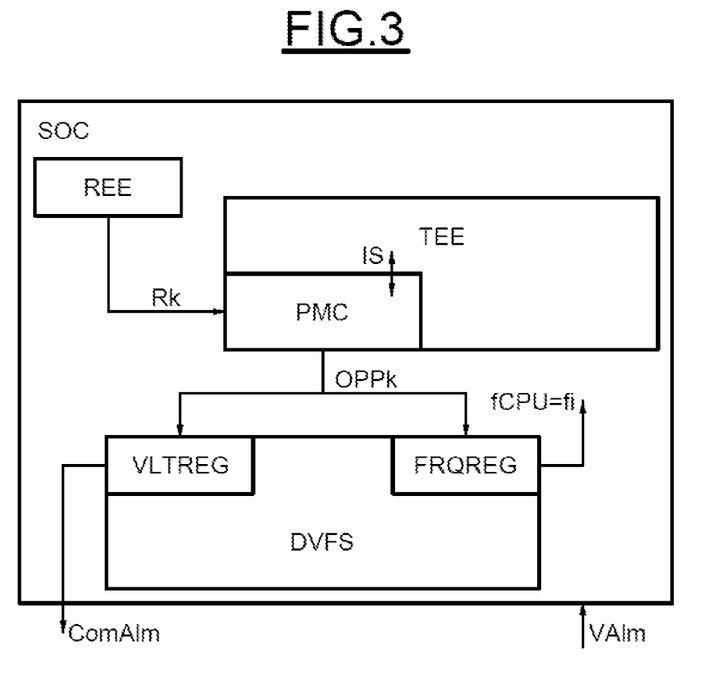

FIG. 3 represents a variant embodiment of the system on chip SOC described in relation to FIG. 2. The common elements between the examples in FIGS. 2 and 3 bear the same references and will not be detailed again.

In this variant, the power supply management control module PMC is incorporated in the secure environment TEE. Thus, the non-secure environment REE is configured for sending the request Rk to modify the DVFS power supply to the secure environment TEE.

Consequently, communications of the non-secure environment REE with the secure environment TEE are implemented for scaling the DVFS power supply. These communications are implemented via hardware protection interfaces for the secure environment TEE, and are generally slower than non-secure communications. However, this implementation also allows an advantageous power supply management control on the choice of permitted operating points. This implementation is described later in relation to FIGS. 5A and 5B.

The secure instruction IS corresponds here to an internal instruction of the secure environment TEE, e.g. a computational result transmitted to an interface for generating control signals for controlling the voltage VLTREG and frequency FRQREG regulators of the DVFS power supply.

On the other hand, the secure environment TEE and the non-secure environment REE have been represented as two separate computing units, e.g. of the microprocessor type. Of course, this variant may be envisaged for a secure environment TEE and a non-secure environment REE implemented within the same computing unit of the microprocessor type.

Figure 4A:
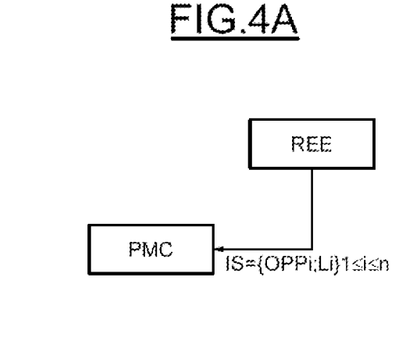
Figure 4B:
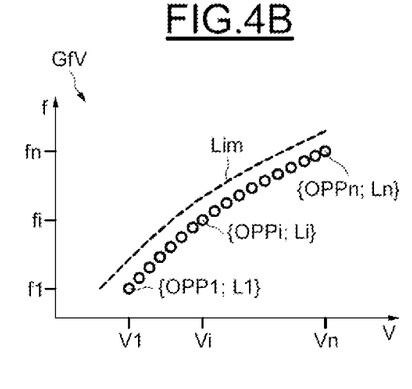
Figure 4C:
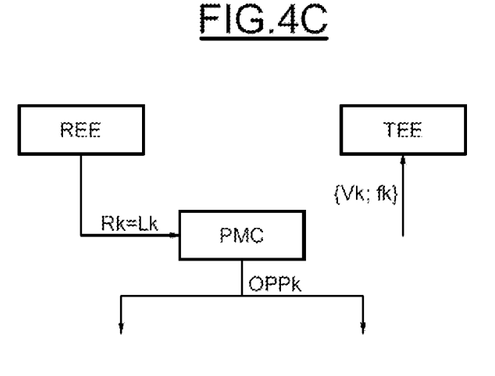

FIGS. 4A, 4B and 4C illustrate an implementation and embodiment of a power supply management control with dynamic voltage frequency scaling.

FIG. 4A illustrates the generation, by the secure environment TEE, of the secure instruction IS defining at least one permitted voltage-frequency operating point $OPP_i$ for the DVFS power supply. For example, n operating points are defined and $1 \le i \le n$.

Usually, the secure environment TEE controls the start-up routines of the systems on chip SOC, and consequently the secure environment TEE is active before the non-secure environment REE. Thus, the secure instruction IS may be generated by the secure environment TEE before the start-up of the non-secure environment REE. This ensures additional protection preventing any potential hacking before the generation of the secure instruction IS.

In this implementation, the secure instruction IS defines the permitted operating points $OPP_i$ ($1 \le i \le n$) for the DVFS power supply and assigns them a respective label $L_i$ ($1 \le i \le n$).

FIG. 4B represents a graph GfV of voltage V and frequency f pairs, on which a curve Lim is plotted showing the upper limit of the possible frequencies f depending on the voltage V, beyond which the logic of the secure environment TEE is dysfunctional.

Thus, all the voltage-frequency pairs located above the curve Lim are not operational conditions of the secure environment TEE.

The graph GfV is used to illustrate an example of definition, by the secure environment TEE, of the operating points permitted and assigned a respective label $\{OPP_i; L_i\} 1 \le i \le n$, according to this implementation and embodiment.

Each permitted operating point $OPP_i$ ($1 \le i \le n$) comprises voltage $V_i$ ($1 \le i \le n$) and frequency f ($1 \le i \le n$) coordinates defined for being under the curve Lim so as to always supply an operational power supply to the secure environment TEE.

The label $L_i$ ($1 \le i \le n$) respectively assigned to each permitted operating point $OPP_i$ ($1 \le i \le n$) is a digital word of any kind, e.g. an arbitrary binary number or an encoded digital word.

FIG. 4C represents a generation, by a non-secure environment REE of the request Rk to modify the DVFS power supply, and the transmission of this request Rk to the power supply management control module PMC.

Thus, the DVFS power supply management control comprises a command $OPP_k$ for scaling the DVFS power supply to a permitted operating point $OPP_k$ ($1 \le k \le n$), if the request Rk to modify the DVFS power supply includes the label $L_k$ ($1 \le k \le n$) of this permitted operating point $OPP_k$.

And, for example, the DVFS power supply is not scaled if the request Rk to modify the DVFS power supply does not include the label $L_i$ ($1 \le i \le n$) of a permitted operating point $OPP_i$.

Thus, the secure environment TEE is necessarily powered by an operational voltage-frequency pair $\{V_k; f_k\}$.

The non-secure environment REE is thus configured for sending the request Rk to modify the DVFS power supply to the power supply management control module PMC. Of course, the non-secure environment REE generating the request Rk must be able to communicate the label as it has been defined by the secure environment TEE.

Since the power supply management control module PMC is only configurable by said secure instruction IS from the secure environment TEE, a fraudulent request Rk aimed at introducing an error in the secure environment cannot be executed.

This implementation and embodiment, described in relation to FIGS. 4A, 4B and 4C, help guard against methods of hacking the secure environment TEE which notably comprise generating an error caused by a modification of the DVFS power supply from the non-secure environment REE.

In addition, this implementation and embodiment have no impact on performance compared with existing systems, and require only a slight modification of the non-secure environment REE to generate requests Ri to modify the DVFS power supply.

Figure 5A:
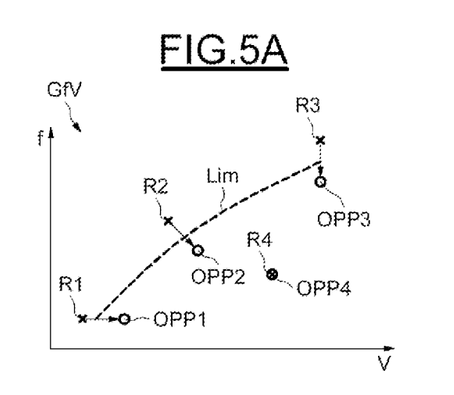
Figure 5B:
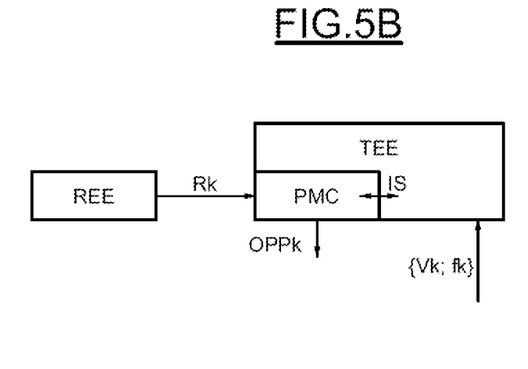

FIGS. 5A and 5B illustrate another implementation and embodiment of a power supply management control with dynamic voltage-frequency scaling.

FIG. 5A represents the graph GfV of voltage V and frequency f pairs, as described above in relation to FIG. 4B, and the curve Lim showing the limit of the possible frequencies f depending on the voltage V, beyond which the logic of the secure environment TEE is dysfunctional.

In this implementation and embodiment, if the request Rk ($1 \le k \le 4$) to modify the DVFS power supply is different from a permitted operating point $OPP_i$, then the DVFS power supply is scaled to the nearest permitted operating point $OPP_k$ ($1 \le k \le 4$). If the request R4 is included in the definition of the permitted operating points $OPP_i$, scaling the DVFS power supply may correspond to the immediate application of said request.

As represented in FIG. 5B, this implementation and embodiment are well suited to a configuration in which the power supply management control module PMC is incorporated in the secure environment TEE. The non-secure environment REE is therefore configured for sending the request Rk to modify the DVFS power supply to the secure environment TEE.

Indeed, the computing capacity of the secure environment TEE may be useful in assessing the permitted operating point $OPP_i$ nearest the request Rk.

For example, the secure instruction IS may define the permitted voltage-frequency operating points OPPi for the DVFS power supply as any voltage-frequency pair located under the curve Lim.

Thus, the secure environment TEE is necessarily powered by an operational voltage-frequency pair {Vk; fk}.

A modelling of the curve Lim may be required, and the shortest distance in the space of the voltage-frequency graph GfV must be calculated. For example, three ways of calculating said shortest distance are illustrated in FIG. 5A:

1) the shortest distance between the permitted operating point OPP1 and the request R1 is calculated only on the voltage V coordinate. This is suitable for low frequency and voltage operating points.

2) the shortest distance between the permitted operating point OPP2 and the request R2 is calculated using the Euclidean norm or equivalent on both the voltage V and frequency f coordinates. This is suitable for any non-extreme frequency and voltage operating point.

3) the shortest distance between the permitted operating point OPP3 and the request R3 is calculated only on the frequency f coordinate. This is suitable for high frequency and voltage operating points.

Of course, any calculation approach is conceivable.

In addition, two points OPPk and OPPi equidistant from Rk may be decided between them according to whether it is preferred to ensure performance in terms of speed or a reduction in consumption.

Thus, said secure instruction IS defining the permitted voltage-frequency operating points OPPi may correspond here to an internal instruction of the secure environment TEE, such as a calculation result, for generating the command OPPk for the DVFS power supply, as described above in relation to FIG. 3.

Of course, a configuration in which the power supply management control module PMC is not incorporated in the secure environment TEE is conceivable. The power supply management control module PMC must then be capable of assessing the permitted operating point nearest to the request. However, this assessment may, if necessary, be very simple in terms of the quantity of calculations required.

In other words, according to one implementation and embodiment, the non-secure environment REE calls on a secure environment TEE service to change an operating point, and it is the secure environment TEE that decides which operating point to control for ensuring that the system on chip SOC will be operational.

The generation and the method of communication of the request Ri, by the non-secure environment REE, will have to be suitable.

This implementation and embodiment help guard against methods of hacking the secure environment TEE which notably comprise generating an error caused by a modification of the DVFS power supply from the non-secure environment REE.

Reference is now made again to FIG. 2.

As an alternative to the implementation and embodiment described above in relation to FIGS. 4A, 4B, 4C and FIGS. 5A, 5B, it is envisaged that the secure environment TEE requires a permitted operating point OPPi, dedicated to the secure environment TEE, and invariable all the time that processing is executed by the secure environment TEE. The permitted operating point dedicated to the secure environment TEE may, for example, be one of the permitted operating points {OPPi}$1 \leq i \leq n$ represented in FIG. 4B, and, for example, chosen according to the performance required for executing said processing.

In this respect the power supply management control module PMC is configured for scaling the DVFS power supply to this permitted operating point OPPi dedicated to the secure environment TEE, and for not modifying the DVFS power supply of this permitted operating point OPPi dedicated to the secure environment TEE, in response to the request Rk to modify the DVFS power supply generated by the non-secure environment.

The secure environment TEE is advantageously configured for recording the previous configuration of the DVFS power supply, when the DVFS power supply is scaled to this dedicated permitted operating point OPPi, and for restoring the last recorded configuration when the secure processing ends.

Thus, no change is necessary in the generation of the request by the non-secure environment REE, and no impact is felt on performance.

The power supply management module control PMC is thus configured as a hardware mechanism for dynamically locking and unlocking access to the DVFS power supply by the non-secure environment REE, according to the secure instruction IS.

Figure 6:
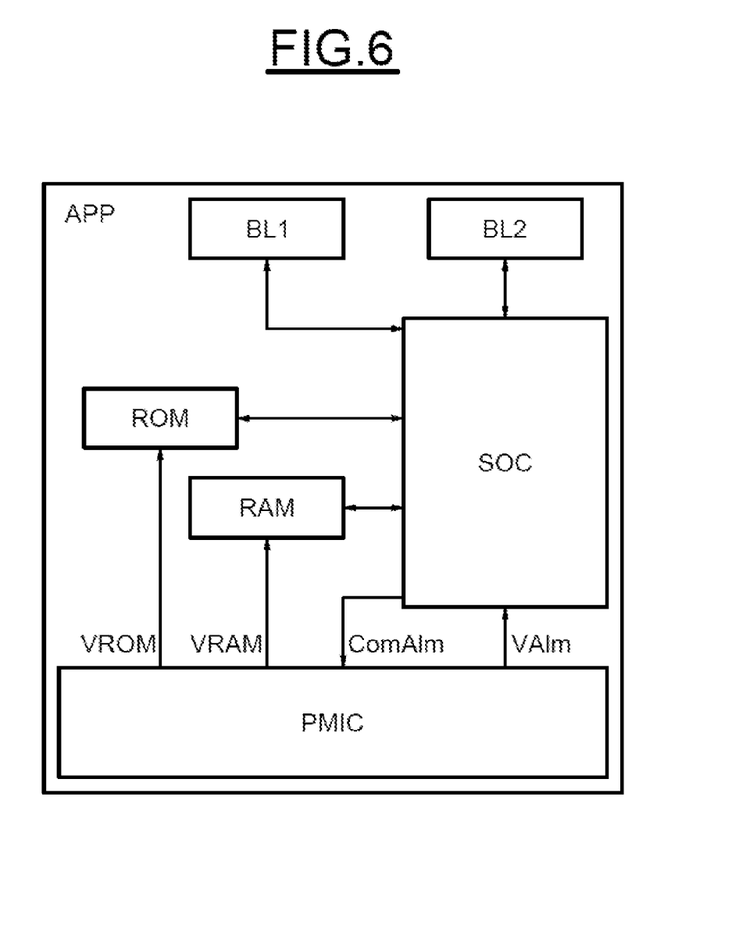

FIG. 6 represents an example of an electronic apparatus APP, comprising an embodiment of a system on chip SOC.

The electronic apparatus APP is, for example, a mobile phone or a vehicle on-board computer, and comprises a system on chip SOC according to one of the embodiments described above, and a voltage supply device PMIC configured for supplying a power supply voltage VAlm controlled ComAlm by the power supply management control module PMC.

Moreover, the apparatus APP usually notably comprises a random access memory RAM, a non-volatile memory ROM and modules BL1, BL2 for various functions. The voltage supply device PMIC is also notably configured for supplying power supply voltages VRAM, VROM to the RAM and ROM memories.

The electronic apparatus APP may comprise a wireless communication module BL1 capable of giving a third-party device access to the non-secure environment REE of the system on chip SOC.

What is claimed is:

1. A method for managing a dynamic voltage and frequency scaling (DVFS) power supply, the method comprising:
   generating, by a secure environment, a secure instruction defining a permitted operating point of voltage and frequency for the DVFS power supply;
   assigning, by the secure environment, a label for the permitted operating point;
   generating, by a non-secure environment, a request to modify the DVFS power supply, the request to modify comprising a voltage-frequency operating point; and
   scaling the DVFS power supply to the permitted operating point, in response to the request to modify the DVFS power supply and in response to determining that the request to modify includes the label of the permitted operating point.

2. The method according to claim 1, further comprising:
   determining whether the request to modify includes the label of the permitted operating point;
   and
   operating the secure environment at the permitted operating point.

3. The method according to claim 2, further comprising:
   operating the secure environment without scaling to the permitted operating point in response to determining that the request to modify does not include the label of the permitted operating point.

4. The method according to claim 1, wherein the secure instruction is generated by the secure environment before a start-up of the non-secure environment.

5. The method according to claim 1, wherein the secure instruction defines a permitted voltage-frequency operating point dedicated to the secure environment, and when secure processing is executed by the secure environment, the scaling of the DVFS power supply comprises:
  a scaling of the DVFS power supply to this permitted operating point dedicated to the secure environment; and
  a non-modification of the DVFS power supply from this permitted operating point, dedicated to the secure environment, in response to the request to modify the DVFS power supply.

6. The method according to claim 5, further comprising:
  recording a previous configuration of the DVFS power supply when the DVFS power supply is scaled to the permitted operating point dedicated to the secure environment; and
  restoring the last recorded configuration when the secure processing ends.

7. The method according to claim 6, wherein the recording of the previous configuration and the restoring of the last recorded configuration are carried out by the secure environment.

8. A method for managing a dynamic voltage and frequency scaling (DVFS) power supply, the method comprising:
  generating, by a secure environment, a secure instruction defining a plurality of permitted operating points, each of the plurality of permitted operating points comprising a different combination of voltage and frequency for the DVFS power supply, the plurality of permitted operating points together defining an upper frequency limit for a given voltage beyond which the secure environment becomes dysfunctional;
  generating, by a non-secure environment, a request to modify the DVFS power supply, the request to modify comprising a voltage-frequency operating point, the voltage-frequency operating point comprising a voltage and a frequency for operating the secure environment;
  scaling the DVFS power supply to an operating point below the upper frequency limit, in response to the request to modify the DVFS power supply and in response to determining that the voltage-frequency operating point in the request is above the upper frequency limit; and
  operating the secure environment at the operating point below the upper frequency limit.

9. The method according to claim 8, wherein the scaling comprises scaling to the nearest one of the plurality of permitted operating points.

10. A system on chip comprising:
  a dynamic voltage and frequency scaling (DVFS) power supply;
  a secure environment configured to generate a secure instruction defining a permitted operating point of voltage and frequency for the DVFS power supply and assign a label for the permitted operating point;
  a non-secure environment configured to generate a request to modify the DVFS power supply, the request to modify comprising a voltage-frequency operating point; and
  a power supply management control module configured to scale the DVFS power supply to the permitted operating point, in response to the request to modify the DVFS power supply and in response to determining that the request to modify includes the label of the permitted operating point.

11. The system on chip according to claim 10, wherein the power supply management control module is configured to:
  determine whether the request to modify includes the label of the permitted operating point.

12. The system on chip according to claim 11, wherein the power supply management control module is configured to not scale to the permitted operating point in response to determining that the request to modify does not include the label of the permitted operating point.

13. The system on chip according to claim 10, wherein the secure instruction further defines additional voltage-frequency permitted operating points for the DVFS power supply, and wherein the power supply management control module is configured to scale to the nearest one of the permitted operating points in response to determining that the voltage-frequency operating point in the request to modify is different from the permitted operating point.

14. The system on chip according to claim 10, wherein the secure environment is configured to generate the secure instruction before a start-up of the non-secure environment.

15. The system on chip according to claim 10, wherein the non-secure environment is configured to send the request to modify the DVFS power supply to the power supply management control module, the power supply management control module only being configurable by the secure instruction from the secure environment.

16. The system on chip according to claim 10, wherein the power supply management control module is incorporated in the secure environment and the non-secure environment is configured to send the request to modify the DVFS power supply to the secure environment.

17. The system on chip according to claim 10, wherein the secure environment is configured to generate the secure instruction defining a permitted voltage-frequency operating point dedicated to the secure environment for the DVFS power supply, and, when secure processing is executed by the secure environment, the power supply management control module is configured to:
  scale of the DVFS power supply to this permitted operating point dedicated to the secure environment; and
  not modify the DVFS power supply from this permitted operating point, dedicated to the secure environment, in response to the request to modify the DVFS power supply.

18. The system on chip according to claim 17, wherein the secure environment is configured to:
  record a previous configuration of the DVFS power supply when the DVFS power supply is scaled to this dedicated permitted operating point; and
  restore the last recorded configuration when the secure processing ends.

19. An electronic apparatus comprising:
  a system on chip comprising
    a dynamic voltage and frequency scaling (DVFS) power supply,
    a secure environment configured to generate a secure instruction defining a permitted operating point of voltage and frequency for the DVFS power supply and assign a label for the permitted operating point, a non-secure environment configured to generate a request to modify the DVFS power supply, the request to modify comprising a voltage-frequency operating point, and a power supply management control module configured to scale the DVFS power supply to the permitted operating point, in response to the request to modify the DVFS power supply and in response to determining that the request to modify includes the label of the permitted operating point; and a voltage supply device configured to supply a power supply voltage controlled by the power supply management control module.

20. The electronic apparatus according to claim 19, further comprising a wireless communication module capable of giving a third-party device access to the non-secure environment of the system on chip.

21. The electronic apparatus according to claim 19, wherein the electronic apparatus comprises a mobile phone or a vehicle on-board computer.

\* \* \* \* \*